Patented Feb. 23, 1954

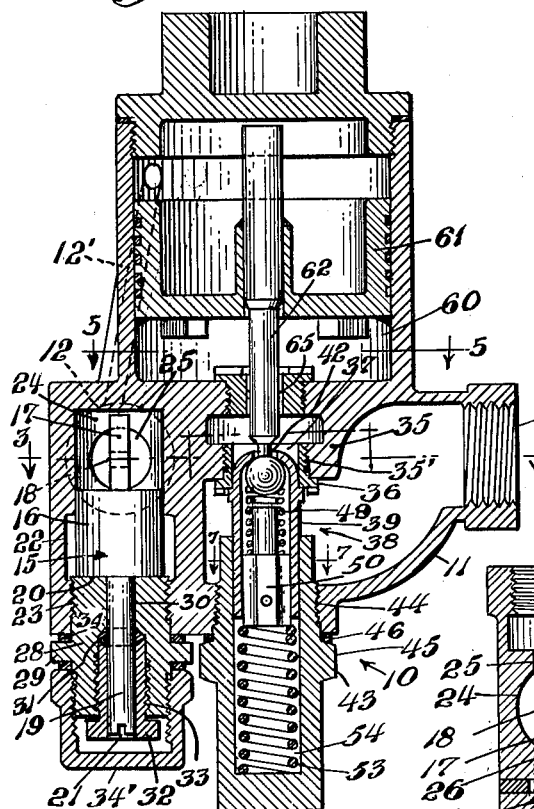

2,670,003

UNITED STATES PATENT OFFICE 2,670,003

WATER-STEAM MIXING VALVE

Edward T. Dahl, Warwick Neck, and Otto Kneisel, Cranston, R. I., assignors to Hammel-Dahl Company, a corporation of Rhode Island Application January 3, 1952, Serial No. 264,784

11 Claims. (Cl. 137—98)

This invention relates to a device for furnishing hot water at a temperature which may be used for a shower, flushing purposes, or some similar use.

Heretofore a device of this character, which may be termed a mixing valve, in use is frequently subjected to considerable change of pressure of the water which is supplied or in pressure of the steam which is supplied. Accordingly there is a varying flow of water due to the varying pressure which serves to fluctuate the temperature in the final result. The variation in the flow of the steam may be throttled by a variation in the line which is found to be a simpler means of controlling the device than by adjusting the spring which operates a valve for controlling the steam.

This invention in its broad aspect contemplates a device for admixture of two fluids which are supplied under pressure and in which the pressure of one of said fluids is subject to vary at different periods and the other held at a reasonably constant pressure. As by way of example, one of said fluids may be cold water supplied from a municipal water supply. The pressure at which said water is furnished is subjected to variation at different periods of the day, the other fluid to be mixed with the water being steam, the pressure of which may be held reasonably constant.

One of the objects of this invention is to provide a movable part which will fluctuate in accordance with the flow of cold water and which in turn will actuate the steam valve to vary the amount of steam which enters the cold water.

Another object of the invention is to so characterize the valve which controls the steam that the steam will enter in proportion to the flow of water so that the percentage of steam and water which are mixed together will be substantially constant.

With these and other objects in view, the invention consists of certain novel features of construction, as will be more fully described, and particularly pointed out in the appended claims.

In the accompanying drawings:

Figure 1 is a diagrammatic view showing the unit of this invention as connected in use;

Figure 2 is a sectional view through the device;

Figure 3 is a sectional view on line 3—3 of Figure 2;

Figure 4 is a fragmental view in section of a portion of Figure 2;

Figure 5 is a sectional view on line 5—5 of Figure 2;

Figure 6 is a sectional view on line 6—6 of Figure 5; and

Figure 7 is a sectional view on line 7—7 of Figure 2.

In the present embodiment of this invention, we arrange to control the flow of the constant pressure fluid by means of a piston-operated valve and use any convenient device responsive to change in the velocity of the flow of another fluid, due to varying pressure, to control the movement of said piston. This device in the instant application may be a Venturi tube. The throat of the venturi and the flow thereto are connected across the said piston, providing a differential pressure condition responsive to changes in velocity of flow therethrough to act on said piston in a direction tending to move the valve to closed position against the pressure of a linear resistant force furnished by a compression spring. The said flow due to varying pressure is initially regulated so as to flow at a predetermined rate at a defined pressure at which the said valve will be opened to provide for the flow of the other fluid at a predetermined volume. Upon a decrease in the flow rate due to varying pressure, this condition will be felt across the piston and the said resultant force will move the piston to close the said valve to proportionally decrease the volume of the other flow and thereby maintain the predetermined ratio of fluid mixture. Additionally, a metering arrangement is provided on the said valve which, conjointly with the edge of the valve seat, provides for metering the flow through the valve to maintain an accurate constant ratio of said fluids to be admixed. In a like manner, upon an increase in the flow rate of the fluid of varying pressure, the differential pressure across the piston tending to move the valve will increase to overcome the said resistant force and will thus move the piston in a direction to move the valve to the open position.

Referring to the drawings for a more detailed description of the invention, 10 (Figure 3) designates a device operable for mixing water and steam to furnish hot water for industrial purposes and comprises a valve casing 11 having a water inlet port 12, a steam inlet port 13, and a hot water discharge port 14. Water and steam entering the valve casing through their respective ports will through suitable conduits meet and mix to be discharged through the port 14.

The flow of water through the device is initially regulated to provide a predetermined flow of water at a predetermined delivered temperature. A valve designated generally 15 (Figure 2) is employed for this purpose and is built within the casing 11 and may be of any suitable type, that shown being of a simple plug construction having a cylindrical body 16 provided at one end with a blade 17 which is disposed diametrically of the body 16 with its edges extending in continuation of the sides of the said body 16. The blade 17 has a central opening 18 therethrough. The other end of the body 16 is reduced to form a stem 19 providing a shoulder 20. The end of the stem has a tool-engaging slot 21 at the free end thereof. The valve body is received within a bore 22 leading inwardly from one side of the casing 11, which bore is internally threaded at its outer end portion as at 23. The inner end portion 24 is made of a reduced diameter so as to rotatably receive the inner end portion of the body 16 with the blade 17 extending inwardly into the bore portion 24 to be in close proximity to the bottom of the bore 24. The bore 24 inwardly of the body 16 communicates with the port 12 by means of an opening 25 (Figure 3) extending laterally through the side wall of the said bore 24 and in axial alignment with the port 12. The blade 17 extends completely across the opening 25. The bore 24 communicates with the discharge port 14 through a similar sized opening 26 which extends through the side wall of said bore 24 and diametrically opposite and in axial alignment with the said opening 25 to open into a chamber designated generally 27, into which the said discharge port 14 opens.

The valve 15 is secured in position by means of a plug 28 which is externally threaded at each end portion and is provided with a flange 29 at a position substantially centrally thereof. The periphery of said flange may be shaped to receive a wrench. The plug 28 is threadingly received within the bore 22 to engage the shoulder 20 and is also provided with a central bore 30 through which the stem 19 passes to rotatably engage the walls of the said bore. The stem is sealed against leakage by a stuffing box like arrangement comprising a compressible seal washer 31 engaged by a member 32 having threaded engagement with an enlarged portion 33 of the bore 30. Sufficient pressure will be applied by the member 32 on said seal 31 to deform the same into tight sealing engagement with the walls of said bore and said stem. The plug 28 is sealed against leakage by means of a gasket ring 34 interposed between the flange 29 and the adjacent side of the casing.

Referring to Figure 3, it will be seen that at the position of the blade 17 shown in full lines, the flow through the opening 25, 26 will be at maximum and that by turning the valve to any of various positions relative to openings 25 and 26, the effective size of said openings 25, 26 may be varied to regulate the flow of water through the device 10. There will be a minimum flow through the valve by flow through the opening 18 at closed position of the gate 17. In practice, the valve 15 is adjusted by turning the stem 19 (Figure 2) such as by means of a screwdriver engaging the slot 21 to provide for a preset desired flow through the device in accordance with the steam supply available to furnish hot water at a predetermined temperature. To prevent readily unauthorized adjustment of said valve 15, a closure cap 34' is threadingly received on the outer end of the plug 28 to enclose the stem 19.

The steam port 13 and chamber 27 are separated by a solid bridge portion 35 which has a threaded opening 35' therethrough. An externally threaded bushing 36 is threadingly received in said opening 35 and provides an opening 37 or steam passage into said chamber 27. The opening is controlled by means of a valve which is designated generally 38 and comprises a tubular body 39 (Figure 4) having an annular flange 40 spaced from the inner end of said body 39 and adapted to seat against the marginal edge 37' about said opening 37 to close the same against the passage of steam therethrough. The said inner end of the valve 38 is partially closed by a wall 41 having a central opening 42 therethrough.

The body 39 is slidably received in a valve receiving member 43 which is threadingly received in an opening 44 extending through a side of the casing 11 (Figure 2) and axially in line with the opening 37 and communicating with port 13. The plug has a flange 45, the periphery of which may be shaped to receive a wrench to tighten the plug in place. A gasket 46 may be interposed between the flange 45 and the casing 11 to seal said plug against leakage. A pressure balanced pilot valve designated generally 47 is positioned within the body 39 and comprises a sphere or ball 48 which is resiliently urged into engagement with the edges of said opening 42 to complete the closing of the upper end of valve 38 by means of a compression spring 49 acting between said ball 48 and a plug abutment 50 which is received within the body 39 and secured thereto for movement therewith as by means of a pin fastening 51. The abutment 50 is made hexagonal in cross-section so as to provide passages 52 to the interior of said body 39 inwardly of the abutment 50. A linear or compression spring 53 is positioned to act against the abutment 50 and the bottom of the bore 54 in which the said body 39 is received and tends to normally seat said valve 38 in engagement with the said marginal edge 37'.

Steam entering said port 13 will leak between the body 39 and adjoining wall of the bore 54 and pass inwardly through passages 52 into the interior of the body 39 to act against the ball 48 in a direction tending to move the ball to seated position. The effective area on said ball 48 exposed to said steam pressure tending to move the said ball to seated position is that equal to the area of the ball engaged by the edge of said opening 42 when said ball is in the closed position.

As previously stated, water is supplied from a supply source, such as a municipal water supply, the temperature of which remains reasonably constant. The pressure of said water supply may, however, vary considerably at different periods of the day for reasons well known. It is preferable that the steam be supplied at a pressure which will be substantially equal to the pressure of the water and in amounts predetermined by the desired temperature of the hot water to be supplied. It is also desirable that the flow of steam be quickly responsive to changes in the rate of flow of water through the device. To achieve these results, the movement of valve 38 is arranged to be controlled by the rate of the flow of water and to this end a Venturi tube-like member 55 (Figure 3) is interposed in the cold water flow by connecting said member 55 to the opening 26 in any convenient manner such, for example, as by threaded engagement with the walls of the opening as at 56. The body of member 55 is provided with a plurality of openings 57 therethrough into the chamber 27 to extend to near the junction of the port 14 and said chamber 27. The throat portion of said member 55 is provided with an opening 58 therethrough which connects with a conduit 59 extending to the bottom of a cylinder 60 formed in the said casing 11 (see Figures 3 and 5). A piston 61 is mounted for reciprocation within said cylinder and a conduit 12' from the port 12 extends to the upper portion of the cylinder 60 above the piston 61 thereby providing for a differential pressure across said piston 61 tending to move the piston inwardly of said cylinder. A valve operating plunger 62 having a reduced end portion 63 providing a shoulder 64 (see Figures 2 and 4) is attached to said piston in any suitable manner and projects inwardly thereof through a central opening 65 in the bottom of the cylinder 60 to extend axially in line with the valve 38 and with the said reduced portion 63 projecting through the opening 42 into engagement with the ball 48. The spring 53 will provide a resistance or opposing force to the movement of valve 38 proportional to the compression of the spring 53.

Upon the opening of said device 10 to the flow of water therethrough, the differential pressure established across the piston 61 will move the piston 61 inwardly to initially unseat the ball closure 48. The steam pressure acting on the ball 48 as previously described will escape through opening 42 and the spring 49 under pressure of ball 48 will collapse and further movement of the piston in the same direction will cause the shoulder 64 on the plunger 62 to engage the valve 38 to move the same from its seat against the pressure of the spring 53, thus opening the valve 38 to the passage of steam through opening 37 into chamber 27. Upon a drop in pressure in the cold water line, the resulting differential across the piston 61 will permit expansion of the spring 53 proportionally to move the valve 38 toward closed position to control the passage of steam through the opening 37. The amount of flow of steam through the valve will equal a constant times the square of the amount of lift of the valve from its seat. To further control the amount or volume of steam passing through opening 37 to maintain a proportionate flow in accordance to the rate of flow of the cold water, the outer side of wall 41 is characterized or emperically generated on a curvature as at 66 which is disposed angularly with respect to the direction of movement of the body 39 to obtain any desired flow versus lift characteristic in accordance with the application in which the valve will be used taking into account the normal flow to be expected through ports 12 and 13. The surface 66 conjointly with the edge 67 of the opening 37 provides for metering the volume of steam passing through said opening in proportion to the movement of said valve 38.

Steam entering chamber 27 will pass through openings 57 into the bore of the tube 55 to mix with the flow of water therein by condensation thereof. Steam leaking by plunger 62 into the low pressure side of the piston 61 will likewise condense and its pressure dispersed without affecting the differential across said piston.

In operation, the mixing device may be positioned in a typical installation as shown diagrammatically in Figure 1. The steam line 70 may be controlled by a usual valve 71 and a steam reducing valve 72 may also be positioned in the steam line to control the pressure of the steam to the steam port 13 of the device. The water line 73 may also have a control valve 74 therein to control the flow of water to the port 12 and the discharge port 14 may be connected through a line 75 to service. The detailed operation of the several elements of the device has been given in connection with the detailed description of the same, and it is believed the operation of the device as a whole will be readily apparent.

It will now be apparent that we have disclosed a mixing device for two different flows in which one of the flows controls the other flow and which upon failure of the said one flow, the other flow is automatically shut off.

We claim:

1. A device for controlling the flow of a second fluid for affecting the admixture of said second fluid with a first fluid in predetermined amounts to said first fluid, comprising a mixing chamber, a passage for the flow of said first fluid to said chamber, a passage for the flow of the second fluid to said chamber, a piston-operated valve for controlling the passage for the flow of the second fluid into said chamber, and means including a restriction in the first passage to create a differential pressure, said pressure transmitted across said piston tending to move the same to control the flow of the second fluid.

2. A device for affecting the admixture of two fluids at a predetermined volume ratio and in which one of said fluids may be of constant pressure and the other variable as to pressure, comprising a housing having walls forming a mixing chamber, a first passage for the fluid of variable pressures to said chamber, a second passage for the fluid of constant pressure to said chamber, means including a restriction in said first passage to create pressure differentials in the flow of fluid through said first passage in response to flow, a valve forming part of said second passage, said valve including a pressure differential responsive device operable to increase or decrease the flow of fluid through said second passage and means for connecting the pressure differentials in said first passage to said pressure differential responsive device to operate the same in accordance with the pressure differentials transmitted thereto.

3. A device for affecting the admixture of two fluids at a predetermined volume ratio and in which one of said fluids may be of constant pressure and the other variable as to pressure, comprising a housing having walls forming a mixing chamber, a first passage for the fluid of variable pressures to said chamber, a second passage for the fluid of constant pressure to said chamber, valve means for controlling the second passage, means including a restriction forming part of said first passage adapted to create a pressure differential responsive to the flow of said liquid of variable pressure, said valve means including a pressure differential responsive device operable for affecting the moving of said valve means to and from closed position, means to transmit pressure derived from one point along said restriction of the flow of fluid of variable pressure in said first passage to the pressure differential responsive device, and means to transmit pressure derived from another point along said restriction in said first passage to said pressure differential responsive device whereby said pressure differential responsive device will operate to affect closing and opening of said valve means in accordance with the pressure differentials transmitted by said differential pressure transmitting means.

4. A device for affecting the admixture of two fluids at a predetermined ratio and in which one of said fluids may be of constant pressure and the other variable as to pressure, comprising a housing having walls forming a mixing chamber, a first passage for the fluid of variable pressures to said chamber, a second passage for the fluid of constant pressure to said chamber, valve means for controlling the second passage, a Venturi tube forming part of said first passage, said valve means including a pressure differential responsive device operable for effecting the moving of said valve means to and from closed position, means to transmit pressure derived from one point along said Venturi tube to said pressure responsive device and means to transmit pressure derived from another point along said venturi to said pressure responsive device whereby said pressure differential responsive device will operate to affect closing and opening of said valve means in accordance with pressure differentials transmitted by said differential pressure transmitting means.

5. A device for affecting the admixture of two fluids at a predetermined ratio and in which one of said fluids may be of constant pressure and the other variable as to pressure, comprising a housing having walls forming a mixing chamber, a first passage for the fluid of variable pressures to said chamber, a second passage for the fluid of constant pressure to said chamber, valve means for controlling the second passage, a Venturi tube forming part of said first passage and having a throat portion and a larger portion extending into said chamber, said larger portion extending into said chamber having a plurality of openings in the wall thereof for the passage into said larger portion of the other fluid entering said chamber, said valve means including a pressure differential responsive device operable for effecting movement of said valve means to and from closed position, means to transmit pressure from the upstream side of said Venturi tube to said pressure differential responsive device, means to transmit pressure from the said throat of the venturi to said pressure differential responsive device whereby said pressure differential responsive device will operate to effect closing and opening of said valve means in accordance with pressure differentials transmitted by said differential pressure transmitting means.

6. A water and steam mixing device comprising a housing having walls forming a mixing chamber, a first passage for the water to said chamber, a second passage for the steam to said chamber, means forming a restriction in said first passage to create pressure differentials in the flow of water through said first passage, a flow controlling means forming part of said second passage, said flow controlling means including a pressure differential responsive device operable to increase or decrease the flow of steam through said second passage, means to transmit pressure derived from one point of the flow of water in said first passage to said pressure differential responsive device, means to transmit pressure derived from another point of the flow of fluid in said first passage to said pressure differential responsive device whereby said pressure differential responsive device will operate to effect the said increase or decrease in the flow of steam in accordance with the pressure differentials transmitted by said transmitting means.

7. In a water and steam mixing device, a mixing chamber, a water conduit to said chamber, a steam conduit to said chamber, valve means for controlling the steam conduit including a valve seat forming part of said steam conduit, a spring pressed closure for said seat, a plunger for engaging said closure, a piston carried by said plunger and movable to move said closure from said seat, means incorporated in the water conduit and forming part thereof adapted to create pressure differentials in the flow of water in said water conduit, means to transmit pressure derived from one point of the flow of water in said conduit to one side of said piston, and means for transmitting pressure derived from another point of the flow of water in said water conduit to the other side of said piston whereby said piston will be moved to move said plunger in a direction in accordance with the pressure differential transmitted across said piston.

8. In a water and steam mixing device as set forth in claim 7 wherein said means adapted to create pressure differentials in the water conduit is a Venturi tube.

9. In a water and steam mixing device, a housing having walls forming a mixing chamber, a water conduit to said chamber, a steam conduit to said chamber having a valve seat therein, a hollow valve member for engaging said seat and having a pressure area subject to pressure from said steam conduit tending to move said member onto said seat, a vent conduit for venting said pressure from the steam conduit acting on said valve member, a closure for said vent conduit, means for initially moving said closure to open position and thereafter moving said valve member to open position, said means including a pressure differential responsive device, means forming part of said water conduit and adapted to create pressure differentials in the flow of water through said water conduit, means for transmitting pressure derived from one point of the flow in said water conduit to said pressure differential responsive device and means for transmitting pressure derived from another point of the flow in said water conduit to said pressure differential responsive device whereby the same will operate to effect moving of said closure to open position and said valve member from said seat in accordance with the said pressure differentials transmitted.

10. In a water and steam mixing valve device as set forth in claim 9 in which said valve member is shaped so as to control the flow in proportion to the linear movement of the valve from its seat.

11. A device for controlling the flow of a second fluid for affecting the admixture of said second fluid with a first fluid in predetermined amounts to said first fluid, comprising a valve casing, a mixing chamber, a passage for the flow of the said first fluid to said chamber, a passage for the flow of the second fluid to said chamber, a valve for controlling the passage for the flow of the second fluid to the chamber, a control means for said valve comprising a chamber along the actuating stem for said valve, said chamber having movable means therein to divide the chamber into two parts, said movable means being coupled to the valve actuating stem, restriction means in said first passage to create a pressure differential in response to the flow of fluid therein, said pressure differential being transmitted across said chamber dividing means to move the same and control the flow of the second fluid.

EDWARD T. DAHL.
OTTO KNEISEL.

References Cited in the file of this patent

UNITED STATES PATENTS

| Number | Name | Date |
| --- | --- | --- |
| 2,009,102 | Bern | July 23, 1935 |
| 2,064,244 | Davies et al. | Dec. 15, 1936 |

FOREIGN PATENTS

| Number | Country | Date |
| --- | --- | --- |
| 658,787 | Germany | Apr. 12, 1938 |